United States Patent Office 3,389,106
Patented June 18, 1968

3,389,106
CURING OF LIQUID POLYSULFIDE POLYMERS
Billy D. Simpson, Bartlesville, Okla., assignor to Phillips Petroleum Company, a corporation of Delaware
No Drawing. Filed July 15, 1966, Ser. No. 565,374
10 Claims. (Cl. 260—24)

ABSTRACT OF THE DISCLOSURE

A liquid polysulfide polymer prepared by reacting (1) sulfur, (2) is a polythiol having the formula $R(SH)_n$ wherein R is a hydrocarbon radical selected from the group consisting of saturated aliphatic, saturated cycloaliphatic, and aromatic radicals and combinations thereof, said hydrocarbon radical having from 3 to 20 carbon atoms and having a valence equal to $n$, and $n$ is an integer of at least three, and (3) a dithiol selected from the group consisting of 3-(2-mercaptoethyl)cyclohexanethiol and 4 - (2 - meracaptoethyl)cyclohexanethiol and mixtures thereof under suitable reaction conditions to produce a liquid polysulfide polymer is crosslinked by contacting said polymer with a curing system consisting essentially of lead dioxide and at least one member selected from the group consisting of cobalt linoresinate, lead naphthenate, zinc naphthenate copper naphthenate, manganese naphthenate, and chrominum naphthenate.

---

This invention relates to a process for curing certain polysulfide polymers.

Polysulfide polymers, in general, have been found to be useful in a number of applications. For example, it is known that some liquid polysulfide polymers can be cured to solid compositions with various curing agents. Such polymers are of utility in applications requiring sealants, caulking materials and the like. In such applications it is usually important that curing the achieved at atmospheric temperature. However, some polysulfide polymers are not readily curable with standard curatives in a reasonable period of time at atmospheric temperature although they are curable at elevated temperatures. One such polymer with which atmospheric curing difficulties have been encountered is a polymer produced by the reaction of sulfur with a polythiol having at least three mercapto groups and at least one dithiol selected from the group consisting of 3-(2-mercaptoethyl)cyclohexanethiol and 4-(2-mercaptoethyl(cyclohexanethiol.

In accordance with the invention, it has been discovered that the foregoing polymer can be readily cured at atmospheric temperature by the action of an admixture of lead dioxide and at least one member selected from the group consisting of cobalt linoresinate, lead naphthenate, zinc naphthenate, copper naphthenate, maganese naphthenate, and chormium naphthenate. This is surprising as the foregoing polymer is not readily curable at atmospheric temperature with the lead dioxide alone or the second curing agent alone, or with admixtures of lead dioxide and other naphthenate.

According it is an object of the invention to provide a process for curing certain polysulfide polymers at atmospheric temperature. Another object of the invention is to provide a faster curing system for certain liquid polysulfide polymers.

Other objects, aspects and advantages of the invention will be apparent from a study of the specification and the appended claims to the invention.

The polythiol utilized in the process of the invention can be represented by the formula:

$$R(SH)_n$$

where R is a hydrocarbon radical selected from the group consisting of saturated aliphatic, saturated cycloaliphatic, and aromatic radicals and combinations thereof such as aryl-substituted aliphatic radicals, alkyl-substituted aromatic radicals, and the like, said hydrocarbon radical having from 3 to about 20 carbon atoms and having a valence equal to $n$, and $n$ is an integer of at least three to provide crosslinkage sites. While $n$ will generally be in the range of 3 to 6, it is presently preferred that $n$ be 3 or 4 because of the greater availability of the compounds. Examples of polythiols suitable for use in accordance with the invention include 1,2,3,-propanetrithiol, 1,2,4-butanetrithiol, 1,2,34-butanetetrathiol, 1,2,3-pentanetrithiol, 3-methyl- 1,2,3-heptanetrithiol, 1,2,10-decanetrithiol, 1,2,3, 5,6-dodecanepentathiol, 1,2,4,5,7,8-hexadecanehexathiol, 2,3,5,8-eicosanetetrathiol, 1,2,3-cyclopentanetrithiol, 1,2, 3,4-cyclohexanetetrathiol, 2-ethyl-1,2,3,4-cyclooctanetetrathiol, 2 - (mercaptomethyl)-1,3-cyclopentanedithiol, 2-cyclohexyl-1,3,4-butanetrithiol, 1,2,3-benzenetrithiol, 1,2, 4,5-benzenetetrathiol, toluene - 2,3,4 - trithiol, toluene $\alpha$,2,3,4-tetrathiol, and 2-phenyl-3,6-hexanetrithiol, and mixtures thereof.

The dithiol utilized in the process of the invention is selected from the group consisting of 3-(2-mercaptoethyl)cyclohexanethiol, 4-(2-mercaptoethyl) cyclohexanethiol, and combinations thereof. The presently preferred material is a mixture of 3-(2-mercaptoethyl)cyclohexanethiol and 4-(2-mercaptoethyl)cyclohexanethiol as prepared in accordance with the process of Example I of Rector P. Louthan, U.S. 3,050,452, issued Aug. 21, 1962. While the mixture of dithiols can be a distilled fraction, it is also within the contemplation of the invention to utilize the dithiol in admixture with other materials, such as the crude product of Example I of U.S. 3,050,452. However, it is desirable to minimize the presence of reactive monofunctional compounds as these materials tend to prematurely terminate the polymer growth.

The mole ratio of polythiol containing at least three mercapto groups to dithiol can vary over a broad range, depending in part on the particular polythiol employed, but will generally be in the range of about 0.0001:1 to about 0.1:1; and perferably will be in the range of about 0.005:1 to about 0.05:1. The ratio of dithiol to sulfur will generally be in the range of about 0.5 to about 4 moles of dithiol per gram-atom of sulfur and will preferably be in the range of about 0.8 to about 2 moles of dithiol per gram-atom of sulfur.

The polythiol, dithiol and sulfur can be reacted in the presence or absence of a catalyst and in the presence or absence of a solvent. When desired, a basic catalyst can be utilized to accelerate the reaction of the sulfur with the thiols. The presently preferred catalysts are amines, ammonia, and the oxides, hydroxides, and carbonates of lithium, sodium, potassium, rubidium, cesium, magnesium, calcium, strontium, and barium. When desired, a solvent such as chloroform, carbon tetrachloride, benzene, toluene, xylene and the like can be employed. While the order of addition of sulfur, polythiol and dithiol can be varied, it is presently preferred to premix the polythiol and dithiol to provide a more uniform polymer. All of the sulfur can be introduced into the reaction initially or the sulfur can be added incrementally. Although the temperature of the reaction can vary within a considerable range, it will generally be in the range of about $-20°$ C. to about $250°$ C. and will usually be in the range of about $20°$ C. to about $200°$ C. The reaction time also can vary considerably, depending in part on the temperature and whether a catalyst is utilized, but will generally be in the range of about 1 minute to about 2 days and will usually be in the range of about 5 minutes to about 12 hours. The pressure need be only sufficient to maintain the reactants and/or solvent substantially in the liquid phase.

The molecular weight of the liquid polymeric material produced by the reaction can vary in a wide range but generally will be in the range of 400 to about 10,000, depending upon the ratios of the polythiol, dithiol and sulfur and upon the conditions of the reaction, and more usually will be in the range of about 600 to about 2250. The Brookfield viscosity of the liquid polymer ranges from about 1,000 to about 500,000 c.p.s., preferably about 2,000 to about 350,000 c.p.s. The liquid reaction product can be processed, as by stripping, to remove undesired low boiling materials.

The curing system of the invention comprises lead dioxide in combination with at least one member selected from the group consisting of chromium naphthenate, manganese naphthenate, copper naphthenate, zinc naphthenate, lead naphthenate, and cobalt linoresinate. The lead dioxide should be employed in an amount sufficient to provide about 1 to about 4 molecules of lead dioxide per four mercapto groups in the crosslinkable polysulfide polymer, preferably in an amount sufficient to provide about 2 to about 3 molecules of lead dioxide per four mercapto groups in the polymer. The mercaptan content of the polymer can be determined by titrating an acetone solution of the polymer with a standard solution of mercuric perchlorate in acetone, using 4,4'-bis(dimethylamino)thiobenzophenone as indicator. To provide better mixing, the lead dioxide is preferably employed as a dispersion in a vehicle such as dibutyl phthalate. The second component of the curing system is generally employed in an amount sufficient to provide about 0.001–1 part by weight of the metal for each 10 parts by weight of the crosslinkable polysulfide polymer, usually being employed in an amount sufficient to provide about 0.005–0.5 part by weight of the metal for each 100 parts by weight of the polymer. If desired, the second component can be employed as a solution in a solvent which is non-reactive under the conditions employed. In the presence of the lead dioxide and at least one of the second components, the crosslinkable polysulfide polymer gradually cures at room temperature, becoming a soft elastomeric solid within a period of about 0.2–2 hours, and become substantially completely cured after about 1–6 days. Higher temperatures, of course, effect more rapid curing, but application of the composition as a sealant, caulking material, or the like is usually more conveniently carried out at room or atmospheric temperature.

The following examples are presented in further illustration of the invention and should not be construed to unduly limit the invention.

EXAMPLE I

A mixture of 3-(2-mercaptoethyl)cyclohexanethiol and 4-(2-mercaptoethyl)cyclohexanethiol was prepared by the method of Example I in U.S. 3,050,452. To a mixture of 5.0 moles of the dithiols, 0.075 mole of 1,2,3-propanetrithiol, and 3 ml. of tri-n-butylamine at 26–27° C. was added 4.18 g.-atoms of sulfur over a period of 4 hours. The mixture was then heated to 150° C. over a period of 1 hour, after which time the mixture was maintained at 150–190° C. for about 3 hours under reduced pressure from a water aspirator. The resulting cross-linkable polysulfide polymer had a mercaptan sulfur content of 8.72 weight percent, determined by titrating an acetone solution of the polymer with a standard solution of mercuric perchlorate in acetone, using 4,4'-bis(dimethylamino)thiobenzophenone as indicator, thus indicating the average molecular weight of the polymer to be approximately 730. The Brookfield viscosity of the polymer was 88,000 c.p.s. at 26° C. A mixture of 20 parts by weight of the crosslinkable polysulfide polymer, 9 parts by weight of lead dioxide paste (67 weight percent technical lead dioxide in di-n-butyl phthalate), and 0.04 part by weight of a cobalt linoresinate solution containing 6 weight percent cobalt was allowed to stand at room temperature for 4 days. The mole ratio of lead dioxide to mercapto groups was 0.55:1. The tensile strentgh of the resulting cured composition was 348 p.s.i., and the ultimate elongation was 265 percent, as determined by the procedure of ASTM D 412–62T, the die used being similar to die D described therein except that the length of the reduced section was ¾ inch instead of 1$\frac{5}{16}$ inches. The Shore A hardness (ASTM D 1706–61; Shore durometer, type A) of the resulting composition was 65.

When a mixture of 10 parts by weight of the crosslinkable polysulfide polymer and 4.5 parts by weight of lead dioxide paste (67 weight percent technical lead dioxide in di-n-butyl phthalate), in the absence of cobalt linoresinate, was allowed to stand at room temperature for 4 days, the polymer did not cure, but remained tacky and non-elastomeric. Similarly, when a mixture of 10 parts by weight of the crosslinkable polysulfide polymer and 0.02 part by weight of a cobalt linoresinate solution containing 6 weight percent cobalt, in the absence of lead dioxide, was allowed to stand at room temperature for 4 days, the polymer did not cure.

EXAMPLE II

A mixture of 5 g. of the crosslinkable polysulfide polymer prepared in Example I, 2.7 g. of lead dioxide paste (67 weight percent technical lead dioxide in di-n-butyl phthalate), and 2 drops of a metal naphthenate or linoresinate solution was allowed to stand at room temperature for 18 hours, after which time the hardness of the cured composition was determined. The following table shows the hardness of the compositions obtained through the use of various metal-containing solutions.

TABLE

| Metal-containing solution | Weight percent metal in solution | Shore A Hardness [1] |
|---|---|---|
| Chromium naphthenate | 4 | 20 |
| Manganese naphthenate | 6 | 30 |
| Copper naphthenate | 8 | 62 |
| Zinc naphthenate | 8 | 40 |
| Lead naphthenate | 24 | 58 |
| Cobalt linoresinate | 6 | 62 |

[1] ASTM D 1706–61. Shore durometer, type A.

Thus, each of the metal-containing solutions in the above table, used in conjunction with lead dioxide, effected curing of the liquid polymer to a solid composition. Curing of the liquid polymer was incomplete when a lithium, sodium, potassium, strontium, barium, or mercury naphthenate solution was employed in conjunction with lead dioxide.

Reasonable variations and modifications are possible within the scope of the foregoing disclosure and the appended claims to the invention.

I claim:

1. A process for curing a liquid polysulfide polymer prepared by reacting (1) sulfur, (2) a polythiol having the formula $R(SH)_n$ wherein R is a hydrocarbon radical selected from the group consisting of saturated aliphatic, saturated cycloaliphatic, and aromatic radicals and combinations thereof, said hydrocarbon radical having from 3 to 20 carbon atoms and having a valence equal to $n$, and $n$ is an integer in the range of 3 to 6, and (3) a dithiol selected from the group consisting of 3-(2-mercaptoethyl)cycloheranethiol and 4 - (2 - mercaptoethyl)cyclohexanethiol and mixtures thereof under suitable reaction conditions to produce a liquid polysulfide polymer; comprising contacting said polymer with a curing system consisting essentially of lead dioxide and at least one member selected from the group consisting of cobalt linoresinate, lead naphthenate, zinc naphthenate, copper naphthenate, manganese naphthenate, and chromium naphthenate.

2. A process in accordance with claim 1 wherein said polymer is contacted with said curing system at substantially atmospheric temperature.

3. A process in accordance with claim 2 wherein said lead dioxide is present in an amount sufficient to provide one to four molecules of lead dioxide for every four mercapto groups in said polymer, and said member is present in an amount sufficient to provide about 0.001 to about 1 part by weight of the metal of said member for each 100 parts by weight of said polymer.

4. A process in accordance with claim 2 wherein said lead dioxide is present in an amount sufficient to provide two to three molecules of lead dioxide for every four mercapto groups in said polymer, and said member is present in an amount sufficient to provide about 0.005 to about 0.5 part by weight of the metal of said member for each 100 parts by weight of said polymer.

5. A process in accordance with claim 3 wherein the mole ratio of said polythiol to said dithiol is in the range of about 0.001:1 to about 0.1:1 and the ratio of said dithiol to said sulfur is in the range of about 0.5 to about 4 moles of said dithiol per gram-atom of said sulfur.

6. A process in accordance with claim 4 wherein the mole ratio of said polythiol to said dithiol is in the range of about 0.005:1 to about 0.05:1, and the ratio of said dithiol to said sulfur is in the range of about 0.8 to about 2 moles of said dithiol per gram-atom of said sulfur.

7. A process in accordance with claim 1 wherein said R is a saturated aliphatic radical having from 3 to 20 carbon atoms.

8. A process in accordance with claim 1 wherein said R is a saturated cycloaliphatic radical having from 3 to 20 carbon atoms.

9. A process in accordance with claim 1 wherein said R is an armoatic radical having from 6 to 20 carbon atoms.

10. A process in accordance with claim 1 wherein said polythiol is 1,2,3-propanetrithiol.

References Cited

UNITED STATES PATENTS 3,219,638  11/1965  Warner _____ 260—79.1

DONALD E. CZAJA, *Primary Examiner.*

W. E. PARKER, *Assistant Examiner.*